US007844910B2

(12) United States Patent
Shiraishi et al.

(10) Patent No.: US 7,844,910 B2
(45) Date of Patent: Nov. 30, 2010

(54) LINKING INFORMATION MAKING DEVICE, LINKING INFORMATION MAKING METHOD, RECORDING MEDIUM HAVING RECORDED A LINKING INFORMATION MAKING PROGRAM, AND DOCUMENT PROCESSING SYSTEM THEREWITH

(75) Inventors: Keiko Shiraishi, Kawasaki (JP); Tadahiko Ikegaya, Kawasaki (JP); Akira Hirose, Kawasaki (JP); Tadao Michimura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 379 days.

(21) Appl. No.: 10/665,794

(22) Filed: Sep. 22, 2003

(65) Prior Publication Data
US 2004/0059716 A1 Mar. 25, 2004

(30) Foreign Application Priority Data
Sep. 20, 2002 (JP) ............................. 2002-275230

(51) Int. Cl.
*G06F 17/00* (2006.01)
(52) U.S. Cl. .................. 715/763; 715/200; 709/201; 358/1.15; 358/1.19
(58) Field of Classification Search ................ 715/530, 715/764, 853, 866, 736, 500, 200, 255, 763; 358/1.15, 445, 1.12, 1.9; 709/102; 705/26; 717/102
See application file for complete search history.

(56) References Cited

U.S. PATENT DOCUMENTS

| 5,243,518 | A | * | 9/1993 | Holt et al. ................... 715/500 |
| 5,584,036 | A | * | 12/1996 | Kashihara ................... 718/102 |
| 5,790,119 | A | * | 8/1998 | Sklut et al. ................... 715/839 |
| 5,872,569 | A | * | 2/1999 | Salgado et al. ............... 715/764 |
| 6,225,998 | B1 | * | 5/2001 | Okita et al. ................... 715/853 |
| 6,243,092 | B1 | * | 6/2001 | Okita et al. ................... 715/866 |
| 6,286,129 | B1 | * | 9/2001 | Agarwal et al. ............. 717/105 |
| 6,370,592 | B1 | * | 4/2002 | Kumpf ........................ 719/328 |

(Continued)

FOREIGN PATENT DOCUMENTS

JP 2002-169735 6/2002

(Continued)

OTHER PUBLICATIONS

Young, M. et al.,"Cantata: Visual Programming Environment for the Khoros System," © 1995, Computer Graphics, vol. 29, pp. 22-24.*

(Continued)

*Primary Examiner*—Doug Hutton
*Assistant Examiner*—James H Blackwell
(74) *Attorney, Agent, or Firm*—Oliff & Berridge, PLC (57) ABSTRACT

A linking information making device including a service list acquisition unit which acquires a service list expressing services which execute predetermined processing of document data; an interface information acquisition unit which individually acquires pieces of interface information from service processing devices respectively providing the services expressed in the service list which has been acquired by the service list acquisition unit; and a linking information making unit which makes linking information to link services provided by the respective service processing devices, based on the interface information which has been acquired by the interface information acquisition unit.

18 Claims, 8 Drawing Sheets

U.S. PATENT DOCUMENTS

| | | | |
|---|---|---|---|
| 6,380,951 B1 * | 4/2002 | Petchenkine et al. | 715/736 |
| 6,407,820 B1 * | 6/2002 | Hansen et al. | 358/1.12 |
| 6,411,314 B1 * | 6/2002 | Hansen et al. | 715/769 |
| 6,483,524 B1 * | 11/2002 | Petchenkine et al. | 715/763 |
| 6,507,845 B1 * | 1/2003 | Cohen et al. | 707/100 |
| 6,539,404 B1 * | 3/2003 | Ouchi | 715/500 |
| 6,553,407 B1 * | 4/2003 | Ouchi | 709/206 |
| 6,606,740 B1 * | 8/2003 | Lynn et al. | 717/100 |
| 6,624,908 B1 * | 9/2003 | Petchenkine et al. | 358/1.15 |
| 6,728,947 B1 * | 4/2004 | Bengston | 717/103 |
| 6,874,124 B2 * | 3/2005 | Murase et al. | 715/530 |
| 6,957,384 B2 * | 10/2005 | Jeffery et al. | 715/501.1 |
| 6,980,332 B2 * | 12/2005 | Simske | 358/445 |
| 6,988,139 B1 * | 1/2006 | Jervis et al. | 709/226 |
| 7,072,059 B2 * | 7/2006 | Van Der Linden et al. | 358/1.15 |
| 2002/0198904 A1 * | 12/2002 | Robles et al. | 707/500 |
| 2004/0039647 A1 * | 2/2004 | Roche | 705/26 |
| 2004/0111430 A1 * | 6/2004 | Hertling et al. | 707/104.1 |
| 2004/0230636 A1 * | 11/2004 | Masuoka et al. | 708/800 |

FOREIGN PATENT DOCUMENTS

WO      WO 01/88729      11/2001

OTHER PUBLICATIONS

Foreign Office Action.

* cited by examiner

I/F INFORMATION

| |
|---|
| SERVICE CLASS |
| SERVICE NAME |
| SERVICE ICON |
| SERVICE INFORMATION LOCATION |
| INPUT |
| OUTPUT |
| PARAMETER RESTRICTION RULES |
| SERVICE LOCATION |
| METHOD NAME |
| INVOCATION METHOD |
| IMPLICIT ELEMENTS |

INSTRUCTION SHEET

| |
|---|
| SERVICE CLASS |
| SERVICE NAME |
| SERVICE ICON |
| SERVICE INFORMATION LOCATION |
| INPUT |
| OUTPUT |
| PARAMETER RESTRICTION RULE |
| SERVICE LOCATION |
| METHOD NAME |
| INVOCATION METHOD |
| IMPLICIT ELEMENTS |
| FLOW (INVOCATION, MAP, METHOD) (CONTROL STRUCTURE, LOGICAL OPERATION) |

FIG. 9

| PROCESSING PROGRESS/RESULT | | |
|---|---|---|
| PROCESSING NAME | STARTING DATE/TIME | STATUS |
| COMMUNICATION WITH MANAGER | 02/06/22 09:05 | NORMAL TERMINATION |
| WRITING INTO HP | 02/06/22 16:39 | ABNORMAL TERMINATION: SERVER DOWN |
| APPROVAL WORKFLOW | 02/06/23 13:01 | UNDER PROCESSING: WAITING FOR MANAGER'S APPROVAL |
| APPROVAL WORKFLOW | 02/06/23 13:02 | UNDER PROCESSING: WAITING FOR CHIEF'S APPROVAL |

120

LINKING INFORMATION MAKING DEVICE, LINKING INFORMATION MAKING METHOD, RECORDING MEDIUM HAVING RECORDED A LINKING INFORMATION MAKING PROGRAM, AND DOCUMENT PROCESSING SYSTEM THEREWITH

CROSS-REFERENCE TO RELATED APPLICATION

This application claims priority under 35 USC 119 from Japanese Patent Application No. 2002-275230, the disclosure of which is incorporated by reference herein.

BACKGROUND OF THE INVENTION

1. Field of the Invention

The present invention relates to a linking information making device, a linking information making method, a recording medium having recorded a linking information making program, and a document processing system therewith. More particularly, it relates to a linking information making device, a linking information making method, a recording medium having recorded a linking information making program, and a document processing system therewith, which are preferable for use in a workflow system constructing a workflow involving electronic processing of paper documents.

2. Description of the Related Art

Nowadays, a workflow system in which paper documents and electronic information are used in a mixed manner is proposed. The workflow system comprises: a scanner; a facsimile machine; a copying machine; or, a multiple function device into which the above scanner and machines are incorporated; a personal computer; a mail server, and the like, which are connected to each other through a network. Especially, efficient processing and electronic processing of paper documents has been executed by introduction of the workflow system in office environments.

The workflow system has been developed, assuming that the system is generally used in offices, for example, for approvals and circulars. That is, the workflow system has been developed by changing existing business systems based on paper documents into electronic systems. Thereby, it is difficult to change the workflow, or to customize the workflow according to individual conditions after the workflow system is developed.

Accordingly, such an inflexible workflow system requires approximately similar costs and development time as those for development of a new system when business procedures are changed or new services are required.

Also, there has been a problem that the whole workflow system does not work well when a part of service processing devices constructing the workflow system breaks down. And, in many cases, it is difficult to find another service processing device, which can be used instead of the broken service processing device, in the workflow system.

Recently, a technology by which Web applications existing on a network are linked with each other has been proposed. Then, it has been required to reduce development costs by providing on-demand services through use of these Web applications as a part of services in the workflow as required.

Conventional workflow systems have predetermined services only to make a workflow. Also, as disclosed in Japanese Patent Application Laid-Open (JP-A) No. 2002-99686, JP-A Nos. 2001-325389, and 2001-195295, a workflow system in which a person involved in the workflow may be added or changed has been already proposed.

However, these workflow systems have had a problem that it is impossible to add a service to a workflow or to change a service in the flow as services, which are provided by the flow, themselves are inflexible.

SUMMARY OF THE INVENTION

The present invention has been proposed to solve the above problems and its object is to provide a linking information making device, a linking information making method, a recording medium having recorded a linking information making program, and a document processing system therewith, in which a workflow is easily made even when services constructing a workflow are changed or added.

A first aspect of the invention provides a linking information making device, wherein the device comprises: a service list acquisition unit which acquires a service list expressing respective services which execute predetermined processing of document data; an interface information acquisition unit which individually acquires pieces of interface information from each service processing devices respectively providing the services expressed in the service list which has been acquired by the service list acquisition unit; and a linking information making unit which makes linking information to link services provided by the respective service processing devices, based on the interface information which has been acquired by the interface information acquisition unit.

A second aspect of the invention provides a linking information making method, wherein the method comprises: a service list acquisition step at which a service list expressing respective services, which execute predetermined processing of document data, is acquired; an interface information acquisition step at which pieces of interface information are individually acquired from service processing devices respectively providing the services expressed in the service list which has been acquired at the service list acquisition step; and a linking information making step at which linking information to link services provided by the respective service processing devices is made, based on the interface information which has been acquired at the interface information acquisition step.

A third aspect of the invention provides a recording medium having recorded a linking information making program, wherein, by the program, a service list expressing respective services which execute predetermined processing of document data is acquired, interface information is individually acquired from service processing devices respectively providing the services expressed in the acquired service list, and processing, which makes linking information to link services provided by the respective service processing devices, based on the acquired interface information, is executed.

In the first to third aspects, the services executed by the service processing device may be copying, transmitting and receiving e-mail, a facsimile service, image processing of document data or the like, but are not limited thereto. The contents, the number, and the like of the services provided by the service processing devices are not limited. The document data may be information related with documents, for example, character information such as text data and image information which is obtained by reading paper documents, and the data is not specially limited.

The service list acquisition unit acquires a service list which expresses each service of a plurality of service processing devices. The interface information acquisition unit acquires interface information from service processing devices included in the service list. Here, the interface information is information which has been held in all service processing devices beforehand and which is used for making of linking information to link the services. Then, the linking information making unit makes linking information to link services provided by the respective service processing devices, using the acquired interface information, in order to make a new workflow.

Accordingly, since a service list is acquired, pieces of interface information are acquired from service processing devices which provides services expressed in the service list, and the linking information is made, using pieces of the acquired interface information, the linking information to link various kinds of services may be easily made according to the first to third aspects of the invention even when a user does not understand all services provided by the respective service processing devices.

A fourth aspect of the invention provides a document processing system which comprises: a plurality of service processing devices which provide services for executing predetermined processing of document data and transmit pieces of service information on a regular basis; a search device provided with: a service information storage unit for storing the pieces of service information which have been transmitted regularly from currently-available service processing devices; a search unit for searching services corresponding to services, for which search has been requested, using the pieces of service information which have been stored in the service information storage unit; and a transmission unit which transmits a service list based on the search results of the search unit, and the linking information making device according to the first aspect which acquires the service list transmitted from the search device.

The service processing devices transmit service information to the search device regularly. Thereby, the search device knows an unavailable service by the absence of service information which is transmitted if the service is available.

In the search device, the service information storage unit stores pieces of service information transmitted from the service processing devices regularly and updates pieces of stored information to the latest pieces of information. Accordingly, the search device may identify the currently-available service processing devices. The search unit searches, using the pieces of service information stored in the service information storage unit, services corresponding to services for which the linking information making device requires to search. The transmission unit transmits the search result to the linking information making device as a service list.

Then, the linking information making device acquires the service list transmitted from the search device and makes the linking information as described in the first aspect.

Accordingly, since the search device makes a service list corresponding to a request for search, the linking information making device acquires pieces of interface information from the service processing devices included in the service list, and makes linking information, using the pieces of the interface information, the linking information to link various kinds of services may be easily made by searching services in the currently-available service processing devices according to the fourth aspect of the invention even when a user does not understand all services provided by the respective service processing devices.

In the fifth aspect of the invention, the transmission unit of the above-described search device may transmit a service list, which expresses services which are services of the currently-available service processing devices and which are corresponding to services for which search has been requested, to the above-described linking information making device.

At this time, according to the fifth aspect of the invention, linking information using services may be made by making a user recognize the services which are services of the currently-available service processing devices and which are corresponding to services for which search has been requested. A user can easily choose currently-available services in order to make linking information.

In the sixth aspect of the invention, the above-described service processing devices may transmit pieces of the input information and output information on the services, the service names, and pieces of the service information location as the above-described service information.

Here, the input information and the output information can be used to classify services.

In the seventh aspect of the invention, the interface information acquisition unit of the above-described linking information making device may acquire service information location to access each service processing device from the above-described search device and interface information from a service processing device, based on the acquired service location information.

At this time, according to the seventh aspect of the invention, a service processing device is specified by acquisition of service information location from the search device and interface information is acquired from the specified service processing device. Thereby, linking information may be made, using the acquired interface information.

The eighth aspect of the invention may further comprise a service linking processing device in which linking processing of services provided by the respective service processing devices is executed, based on the linking information made with the above-described linking information making device.

At this time, a newly-made workflow may be executed according to the eighth aspect of the invention, as the service linking processing device controls linking of services provided by the respective service processing devices according to the linking information.

A ninth aspect of the invention provides a linking information making device, wherein the device comprise: an input device which inputs a service list expressing respective services which execute predetermined processing of document data; and a controller which extracts pieces of port information of respective services from the service list input in the input device, acquires pieces of interface information by accessing service processing devices based on the pieces of extracted port information, and makes linking information for linking services provided by the respective service processing devices, based on the pieces of acquired interface information.

A tenth aspect of the invention provides a search device, wherein the device comprises: a memory storing pieces of service information which are transmitted at any time from currently-available service processing devices; a controller which searches services corresponding to services for which search has been requested, using pieces of service information stored in the memory, and makes a service list expressing services, for which search has been requested, and pieces of port information, based on the search result; and an output device which outputs the service list made in the controller.

A eleventh aspect of the invention provides a document processing system, wherein the system comprises: a plurality of service processing devices which store interface information and transmit service information at any time; the search device according to the tenth aspect of the invention; and the linking information making device according to the ninth aspect of the invention.

In the twelfth aspect of the invention, the above-described service processing devices may transmit at least pieces of port information and the outlines of the services as the above-described service information.

In the thirteenth aspect of the invention, the document processing system may further comprise a service linking processing device in which linking processing of services provided by the respective service processing devices is executed, based on the linking information made with the above-described linking information making device.

DESCRIPTION OF THE PREFERRED EMBODIMENTS

Hereinafter, preferred embodiments of the present invention will be explained in detail, referring to drawings.

First Embodiment

Figure 1:
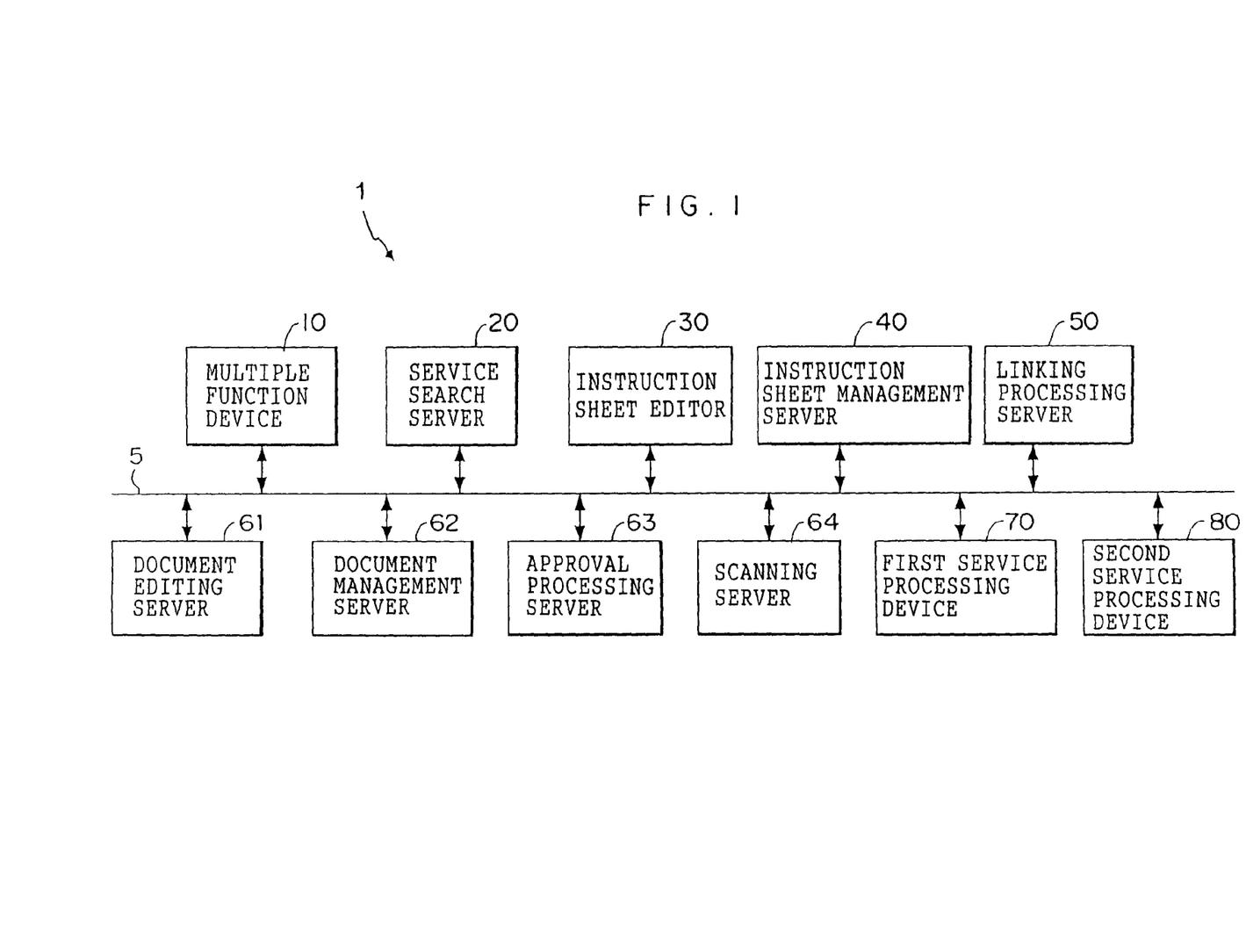
FIG. 1 is a block diagram showing a configuration of a document processing system according to a first embodiment of the invention.

FIG. 1 is a block diagram showing a configuration of a document processing system 1 according to a first embodiment of the invention.

In the document processing system 1, various kinds of services and applications are linked to each other through a network 5. Here, the service means a function that can be used for documents according to the requirement from the outside. For example, copying, printing, scanning, transmitting and receiving by facsimile, delivery of electronic mails, reserving and reading into and from a repository, OCR (Optical Character Recognition) processing, noise rejection processing and the like may be applied as the services.

Specifically, the document processing system 1 comprises: a multiple function device 10 in which services such as copying, printing, scanning, and a facsimile service are executed; a service search server 20 through which a user searches a desired service; an instruction sheet editor 30 which is a client terminal and in which an instruction sheet is made; an instruction sheet management server 40 in which an instruction sheet is managed; and a linking processing server 50 in which linking processing among services is executed according to the instruction sheet.

Moreover, the document processing system 1 comprises: a document editing server 61 with a document editing function; a document management server 62 in which documents are managed; an approval processing server 63 in which an approval processing function is provided; a scanning server 64 in which paper documents are scanned; a first service processing device 70 in which a service processing is executed; and a second service processing device 80 in which a service processing is executed.

The service processing device may be a copying machine, a facsimile machine, a multiple function device, a server, or a computer in which document data are processed in a predetermined manner. Furthermore, the device is not especially limited to the above ones. And, each service processing device is controlled by a predetermined control program. The control program may be downloaded through transmission media such as a network or may be recorded on recording media such as an optical disk, and a magnetic disk.

In the first and a second embodiments, the document processing system 1 has a configuration in which a plurality of devices which execute predetermined service processings are connected to each other through the network 5. However, the invention is not limited to the above-described configuration, if a plurality of services are connected to each other through the network 5.

Here, the instruction sheet means a file which comprises information expressing relations among functions and information (interface information) through which the functions are called when consecutive pieces of processing are decomposed into plural pieces of functional processing. In addition, pieces of information which express graphic user interfaces (GUIs) for the consecutive pieces of processing may be included. Here, a specific configuration of the instruction sheet will be described later.

Also, the linking means that there are relations between services, for example, that the result of a certain service determines services which start afterwards, or exerts influences on operations of the services which start afterwards.

The multiple function device 10 is one of the service processing devices and executes four pieces of service processing of copying, printing, scanning, and a facsimile service. Also, the multiple function device 10 has a linking start function by which an instruction sheet is selected and parameters are input according to operation by a user, and the input parameters are reflected in the instruction sheet to require start of linking processing.

Figure 2:
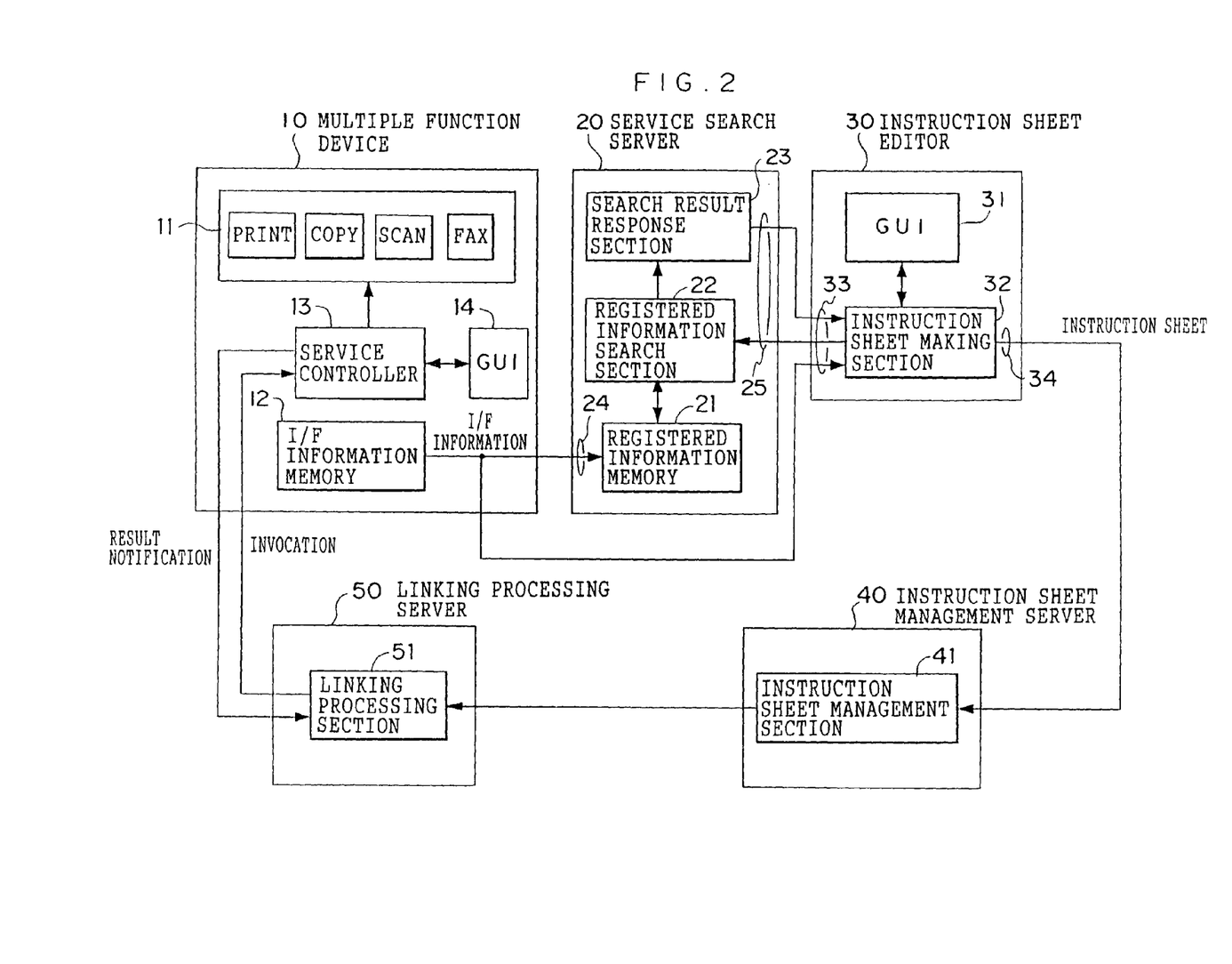
FIG. 2 is a block diagram showing functional configurations of a multiple function device, a service search server, an instruction sheet editor, an instruction sheet management server, and a linking processing server of the document processing system.

FIG. 2 is a block diagram showing functional configurations of the multiple function device 10; the service search server 20; the instruction sheet editor 30; the instruction sheet management server 40; and the linking processing server 50 of the document processing system 1.

The multiple function device 10 comprises: a service providing section 11 in which pieces of service processing of copying, printing, scanning, and a facsimile service are executed; an I/F (interface) information memory 12 in which I/F information is stored; a service controller 13 in which the service providing section 11 is controlled; and a graphic user interface (GUI) 14 which, for example, comprises a touch panel and a button, and through which an instruction sheet and the like are displayed and predetermined operations are executed.

Figure 3:
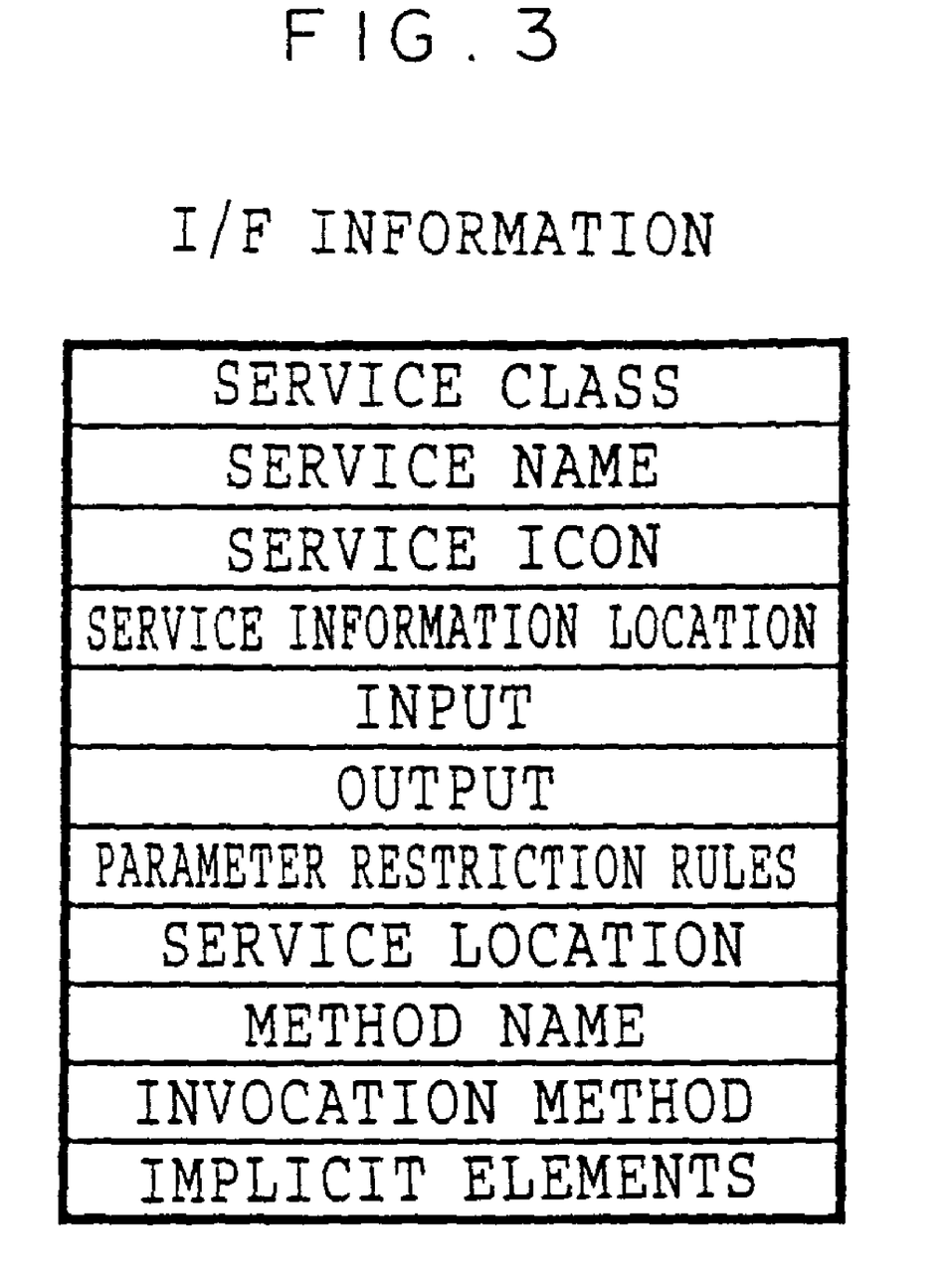
FIG. 3 is a view showing a configuration of I/F information stored in an I/F information registration section.

FIG. 3 is a view showing a configuration of I/F information stored in the I/F information memory 12. The I/F information comprises <Service Class>; <Service Name>; <Service Icon>; <Service Information Location>; <Input>; <Output>; <Parameter Restriction Rules>; <Service Location>; <Method Name>; <Invocation Scheme>; and <Implicit Elements>.

Using the <Service Class>, service classes which are provided by the multiple function device 10 serving as a service processing devices are declared. Here, ones which have bee defined beforehand are used for the <Service Class> and, for example, scanning, printing, repository, Flow and the like may be applied.

Using the <Service Name>, the name of the service provided by the multiple function device 10 serving as a service processing device is declared. Using the <Service Icon>, the location of an icon to be displayed on the GUI of the instruction sheet editor 30 is declared.

Using the <Service information location>, a URL which can be used to acquire this I/F information is declared. Using the <Input>, input of a service is declared. Using the <Output>, output of a service is declared.

Using the <Parameter Restriction Rules>, restriction rules to be imposed on the <Input> and <Output> are declared. Using the <Method>, it is declared the name provided by service for processing.

Using the <Invocation Scheme>, a method by which service processing is called and started is declared. Here, for example, SOAP (Simple Object Access Protocol), SMTP (Simple Mail Transfer Protocol) and the like, which are of a protocol for message exchange, may be used as the <Invocation Scheme>.

Using the <Implicit Element>, data which can be browsed at later processing is declared, though the data is not explicitly passed to later processing as an output. Here, other service processing devices such as servers also have similar I/F information to that of FIG. 3.

Then, the multiple function device 10 registers a part of the I/F information, which has been stored in the I/F information memory 12, in the service search server 20 and transmits the I/F information to the relevant instruction sheet editor 30 according to the requirement from the instruction sheet editor 30.

The service controller 13 has a function in which a list of the instruction sheets transmitted from the instruction sheet management server 40 through the linking processing server 50 is displayed on the GUI 14. The service controller 13 also has another function in which, when an instruction sheet is selected, or when a parameter is input through the GUI 14, the content is reflected in the instruction sheet to execute processing, which can be performed among pieces of processing in the sheet, in the service providing section 11. When all pieces of processing to be executed are completed in the service providing section 11, the service controller 13 transmits the execution results and the instruction sheets to the linking processing server 50.

In the service search server 20, a desired service is searched among the registered pieces of I/F information according to the requirement by the instruction sheet editor 30. Specifically, as shown in FIG. 2, the service search server 20 comprises: a registered information memory 21 in which the I/F information transmitted from service processing devices such as the multiple function device 10 is stored; a registered information search section 22 in which a desired service is searched, using information registered in the registered information memory 21; a search result response section 23 for search result response; and input and output ports 24 and 25.

Here, the registered information search section 22 and the search result response section 23 comprises, for example, ICs.

Though the present embodiment has a configuration in which pieces of the I/F information on services are registered in the registered information memory 21 from the service processing devices such as the multiple function device 10, another configuration in which services of service processing devices distributed on the network are searched to collect I/F information on the services may be applied. Moreover, a further another configuration, in which pieces of information in the I/F information memory 12 provided in the multiple function device 10 of the present embodiment can be searched from the registered information memory 21 of the above-described service search server and I/F information is able to be output to the registered information memory 21, may be applied. By such a configuration, the service search server 20 can search for various kinds of services distributed on the network to collect the I/F information for registration and management. Accordingly, a user can use not only information which has been naturally registered in the side of the service processing device, but also services distributed on the network.

The instruction sheet editor 30 is a client terminal and, at the same time, is provided with an instruction sheet making function. Specifically, as shown in FIG. 2, the instruction sheet editor 30 comprises: a GUI 31 through a user executes operations or on which a service list is displayed; an instruction sheet making section 32 in which an instruction sheet is made; and input and output ports 33 and 34.

The GUI 31 is used when a user searches a desired service, or when a workflow is made. Moreover, the GUI 31 displays a service list which expresses the search result in the service search server 20, application methods of the document editing server 61, an approval processing server 63 and the document management server 62, and pattern information on linking processing which has been held in the instruction sheet editor 30. And, the GUI 31 is also used as a client terminal when predetermined parameters and the like are input.

The instruction sheet making section 32 comprises, for example, ICs. In the instruction sheet making section 32, an instruction sheet, in which display contents at use of the system, input parameters, and a method (workflow) by which a document editing service/an approval processing service/a document management service are linked with each other are defined, is made according to operation of the GUI 31 by a user, and the made instruction sheet is output as a file in an XML format.

Figure 4:
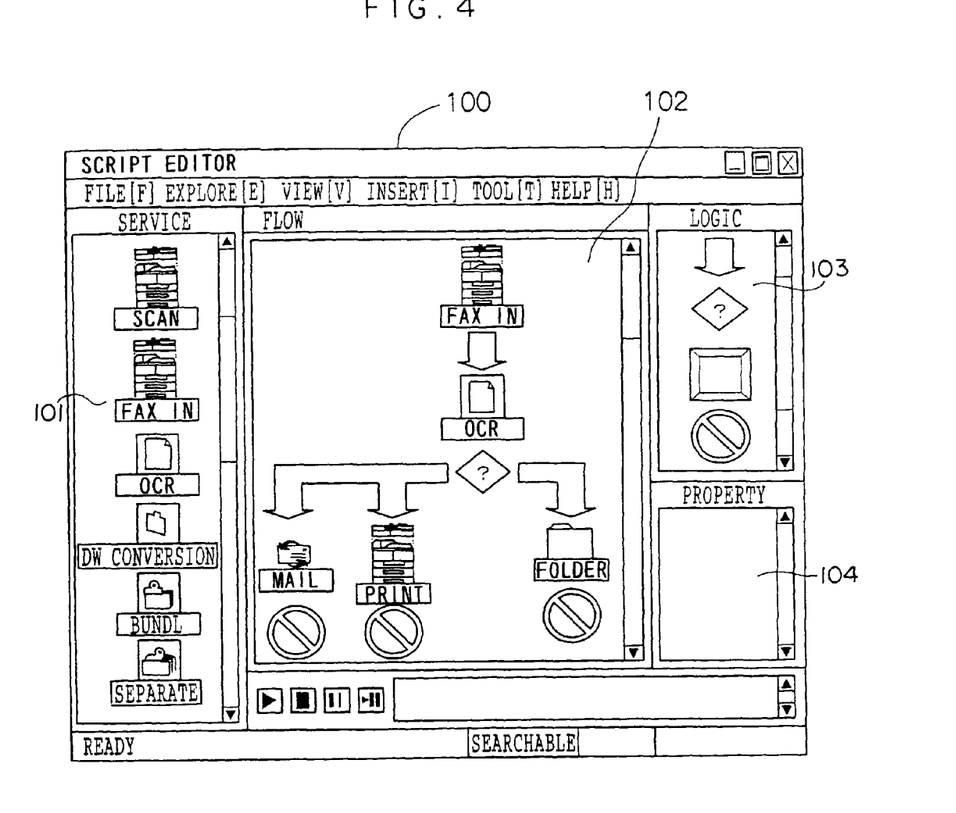
FIG. 4 is a view showing an instruction sheet editor screen displayed on a display section of the instruction sheet editor.

FIG. 4 is a view showing an instruction sheet editor screen 100 displayed on the GUI 31 of the instruction sheet editor 30. The instruction sheet editor screen 100 comprises: a service window 101; a flow window 102; a logic window 103; and a property window 104.

The service window 101 displays various kinds of services such as services in the multiple function device 10. The logic window 103 displays a flow showing a linking pattern among services. The property window 104 displays all setting parameters for the icon chosen from the service window 101 or the logic window 103.

In the instruction sheet making section 32, a service list which expresses the outlines of available services is acquired from the service search server 20 and pieces of I/F information which indicate a method of services are acquired from each service processing device, using pieces of service information location of the processing device which are described in the service list. The instruction sheet making section 32 displays the service window 101 and the property window 104 on the GUI 31, based on the acquired information.

A user may drag and drop the icons from the service window 101 and from the logic window 103 onto the flow window 102 by operating the GUI 31, in order to make a workflow. At this time, the instruction sheet making section 32 makes an instruction sheet by linking services according to operation of the GUI 31.

Furthermore, a user may set services and logic in detail by editing contents displayed on the property window 104 after operating the GUI 31 and selecting a desired icon.

According to the above-described processing, the instruction sheet editor 30 makes an instruction sheet, writes it into a file in an XML format, and then transmits the made instruction sheet to the instruction sheet management server 40.

Figure 5:
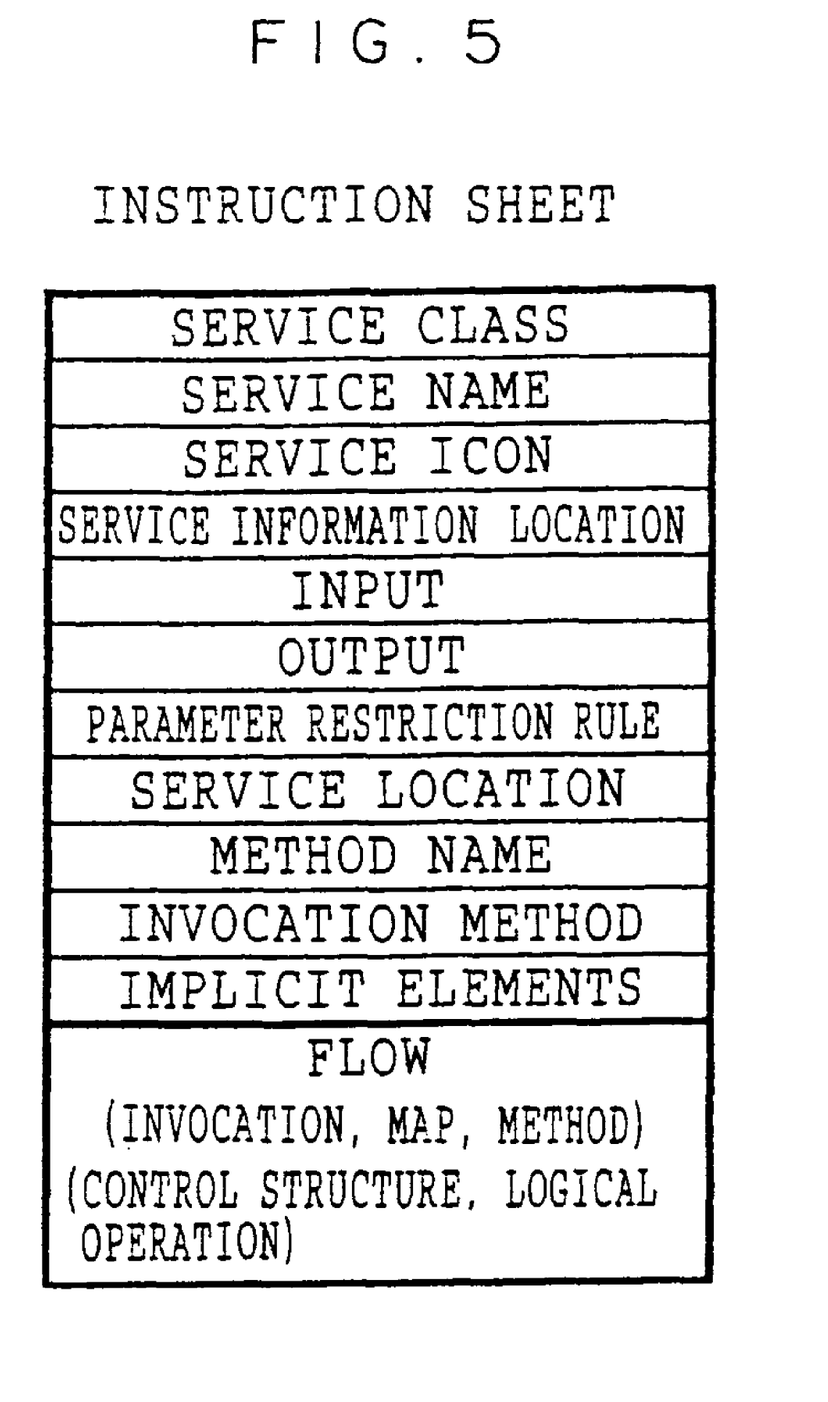
FIG. 5 is a view showing a configuration of an instruction sheet made by an instruction sheet making section.

FIG. 5 is a view showing a configuration of an instruction sheet made by the instruction sheet making section 32. The instruction sheet has another item of <Flow> in addition to the items of the I/F information shown in FIG. 3.

The <Flow> is an element by which linking information among services is described and includes elements such as <Invoke> and <if> for a control structure, a logical operation and an arithmetic operation.

Here, the <Invoke> expresses unique Methods for a service processing device and executes calling a service. The <Invoke> comprises <Map> indicating mapping information of a parameter and <Method> indicating the name of the Method to be called as the element. <if>, <and>, <eq>, <gt>, which indicate the control structure, the logical operation, and the like, executes conditional branch at linking processing, or adjusts parameters which are received and sent from and to services.

In the instruction sheet, all pieces of information on control of linking processing among services are described in the elements of the <flow>. Thereby, the linking processing itself expressed in the instruction sheet is also considered as one of services. Accordingly, the instruction sheet includes the same content as that of the I/F information on another service processing device as described above.

The instruction sheet management server 40 comprises an instruction sheet management section 41 which manages the instruction sheet. The instruction sheet management section 41 holds the instruction sheet transmitted from the instruction sheet editor 30 and transmits the instruction sheet according to the requirement from the multiple function device 10 or the linking processing server 50.

The linking processing server 50 comprises a linking processing section 51 which interprets and executes a specified instruction sheet. When the instruction sheet is transmitted, the linking processing section 51 interprets the instruction sheet, calls predetermined service processing devices, the document editing server 61, the document management server 62, the approval processing server 63, and the like according to the order and the usage, which have been described in the instruction sheet, and executes the linking. Also, the linking processing server 50 saves information on the status of the linking processing under execution or the result of the linking processing which has been completed, and the status or the result of linking processing is notified according to the requirement from the outside.

In the document editing server 61, a document editing screen is displayed on the GUI 31 of the instruction sheet editor 30 which is a client terminal and the document editing function is executed according to operation of the document editing screen, based on the requirement from the linking processing server 50. Also, the document editing server 61 notifies apart of the I/F information to be used for a search service to the service search server 20 at power-on. In addition, the document editing server 61 transmits the I/F information indicating the usage of the document editing service according to the requirement by the instruction sheet editor 30.

In the document management server 62, a document management screen is displayed on the GUI 31 of the instruction sheet editor 30 which is a client terminal and the document management function is executed according to operation of the document management screen, based on the requirement from the linking processing server 50. Also, the document management server 62 notifies a part of the I/F information to be used for a search service to the service search server 20 at power-on. In addition, the document management server 62 transmits the I/F information indicating the usage of the document management service according to the requirement by the instruction sheet editor 30.

In the approval processing server 63, an approval screen is displayed on the GUI 31 of the instruction sheet editor 30 which is a client terminal and the approval processing is executed according to operation of the approval screen, based on the requirement from the linking processing server 50. And, the approval processing server 63 notifies a part of the I/F information to be used for a search service to the service search server 20 at power-on. Furthermore, the approval processing server 63 transmits the I/F information indicating the usage of the approval processing service, based on the requirement from the instruction sheet editor 30.

The scanning server 64 has a function by which scanned data is generated by scanning a paper document, the scanned data is transmitted to an arbitrary address by mail, and the relevant scanned data is saved in an arbitrary location. Here, the scanning server 64 displays a scanning processing screen on the GUI 31 of the instruction sheet editor 30 which is a client terminal, based on the requirement from the linking processing server 50 and the scanning processing is executed according to operation of the scanning processing screen. Also, the scanning server 64 notifies a part of the I/F information to be used for a search service to the service search server 20 at power-on. Moreover, the scanning server 64 transmits the I/F information indicating the usage of the scanning processing service, based on the requirement from the instruction sheet editor 30.

The first service processing device 70 executes predetermined service processing of documents. Here, the first service processing device 70 displays a service processing screen on the GUI 31 of the instruction sheet editor 30, based on the requirement from the linking processing server 50 and the service processing is executed according to the operation of the service processing screen. Also, the first service processing device 70 notifies a part of the I/F information to be used for a search service to the service search server 20 at power-on. In addition, the first service processing device 70 transmits the I/F information indicating the usage of the service processing, based on the requirement from the instruction sheet editor 30.

Here, the second service processing device 80 executes service processings different from those of the first service processing device 70, but the device 80 is operated in a similar manner to that of the first service processing device 70, except the contents of the service processing.

When application programs, by which individual services are executed, are installed in the document editing server 61, the document management server 62, the approval processing server 63, and the like, respectively, the document processing system 1 with the above-described configuration is operated as follows.

The document editing server 61, the document management server 62, the approval processing server 63 and the like notifies information indicating the outlines and the addresses of each service, specifically, a part of the I/F information (for example, <Service Class>, <Service Name>, <Service information location>, <Input>, and <Output>) to the service search server 20 after installation of the applications is completed. Here, all pieces of I/F information may be notified to the service search server 20.

The registered information memory 21 of the service search server 20 saves information transmitted from the document editing server 61, the document management server 62, and the approval processing server 63.

(Instruction sheet Making Processing)

On the other hand, the instruction sheet defining linking among services is made in the instruction sheet editor 30 according to operation by a user. Specifically, the instruction sheet making section 32 in the instruction sheet editor 30 requests a service list indicating available services to the service search server 20 when a user starts the operation for definition of linking among services through the GUI 31. Then, the instruction sheet making section 32 displays the service list on the GUI 31 when the service list and the service information location, which indicate a search result, are transmitted from the service search server 20.

Moreover, the instruction sheet making section 32 acquires I/F information directly from a service processing device, using the service information location which is transmitted with the service list. Here, a display section 32 may request the I/F information which is saved in the service search server 20 and may hold the request result when the service search server 20 holds the I/F information on all service processing devices.

In the instruction sheet making section 32, the instruction sheet which expresses information on the linking flow, GUI information which is displayed at start and in the middle of the linking processing, and the I/F information for each service is made into a file in the XML format when a user defines the linking among services through the GUI 31. Subsequently, the instruction sheet making section 32 transmits the made instruction sheet to the instruction sheet management server 40.

The instruction sheet which has been transmitted from the instruction sheet editor 30 is saved in the instruction sheet management section 41 of the instruction sheet management server 40.

(Start of Linking Processing)

On the other hand, the linking processing may be started in the multiple function device 10. Specifically, the service controller 13 of the multiple function device 10 requests instruction sheets to the instruction sheet management server 40 according to operation on the GUI 14 and displays a list of the instruction sheets transmitted from the instruction sheet management server 40 on the GUI 14.

Figure 6:
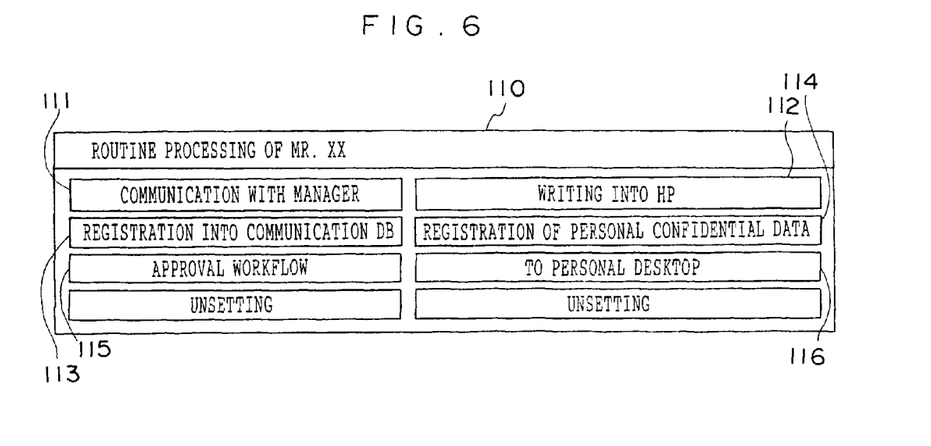
FIG. 6 is a view showing one example of an instruction sheet list screen which is displayed on the display section and expresses the list of instruction sheets.

FIG. 6 is a view showing one example of the instruction sheet list screen 110 which expresses the list of the instruction sheets and is displayed on the GUI 14. The instruction sheet list screen 110 has buttons by which instruction sheets to be displayed are selected. For example, the instruction sheet list screen 110 comprises: a "COMMUNICATION WITH MANAGER" button 111; a "WRITING INTO HP (home page)" button 112; a "REGISTRATION INTO INSTRUCTION SHEET DB (data base)" button 113; a "REGISTRATION OF PERSONNEL CONFIDENTIAL DATA" button 114; "APPROVAL WORKFLOW" button 115; and "TO PERSONAL DESKTOP" button 116. A user may select one or more instruction sheets on the instruction sheet list screen 110.

Figure 7:
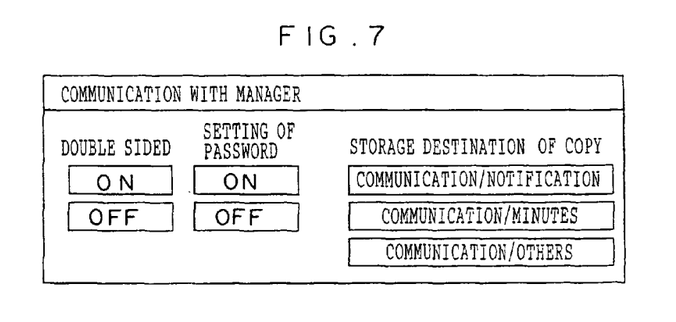
FIG. 7 is a view showing one example of an instruction sheet which is displayed when a "Communication with Mgr" button is selected.
Figure 8:
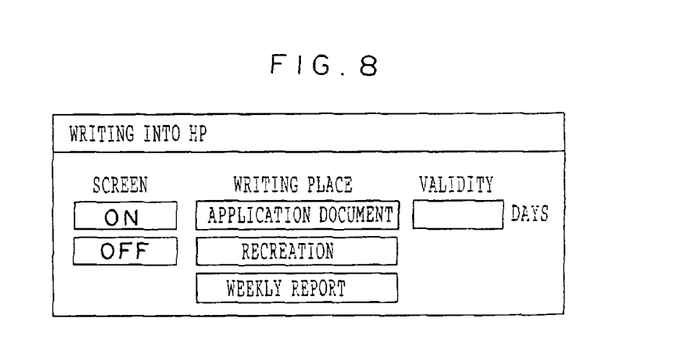
FIG. 8 is a view showing one example of an instruction sheet screen which is displayed when a "Writing into the HP" button is selected.

FIG. 7 is a view showing one example of the instruction sheet screen which is displayed when a "COMMUNICATION WITH MANAGER" button 111 is selected. FIG. 8 is a view showing one example of the instruction sheet screen which is displayed when a "WRITING INTO HP" button 112 is selected.

At this time, a user may select one or more instruction sheet buttons on the instruction sheet list screen 110 by operation of the GUI 14 and may further input necessary parameters.

The service controller 13 controls the service providing section 11 by starting the linking processing when it is detected through the GUI 14 that the start button is pushed. At this time, parameters input through the GUI 14 are reflected in the instruction sheet by the service controller 13. The service controller 13 analyzes the instruction sheet, judges whether a first processing indicated by the instruction sheet can be executed or not in the service providing section 11, and executes the processing if possible. Then, the service controller 13 transmits the processing result in the service providing section 11 and the instruction sheet to the linking processing server 50.

Here, the service controller 13 may display processing progresses and processing results of the started linking processing (not only the own device itself but also other service processing devices are included) on the GUI 14. Specifically, the service controller 13 requests the processing states of pieces of the service processing to the linking processing server 50 and displays the processing progresses/processing results on the GUI 14 when display of the processing progresses/processing results is requested through the GUI 14.

Figure 9:
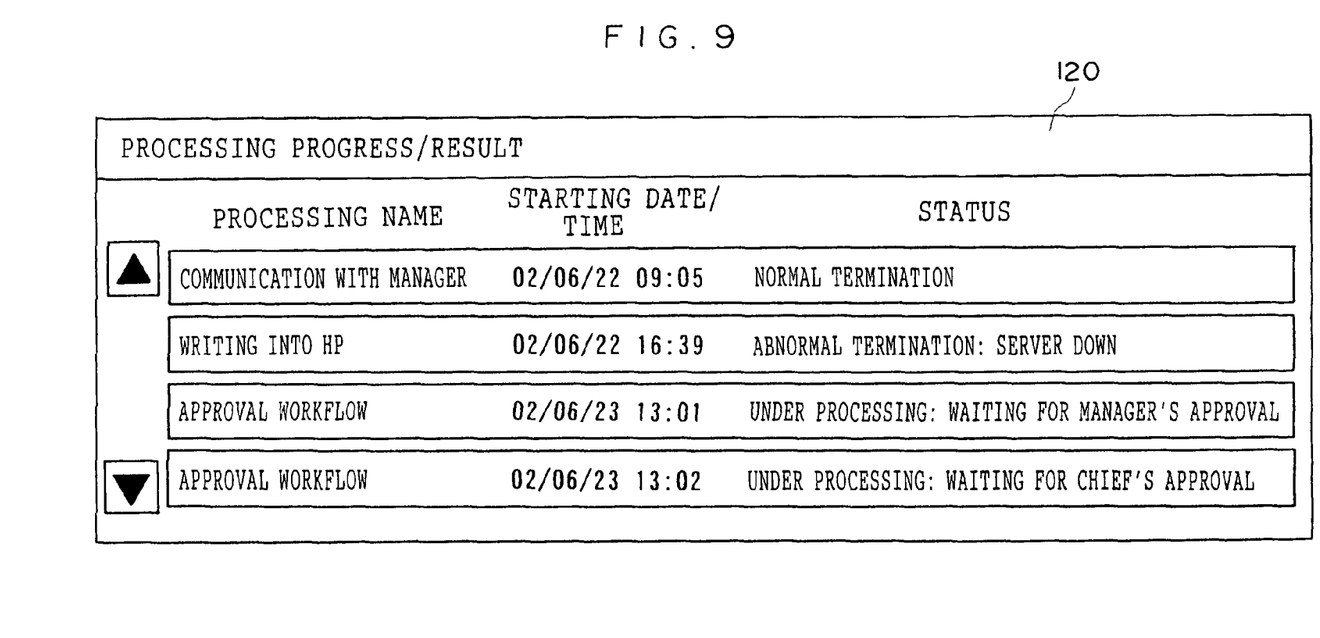
FIG. 9 is a view showing one example of a processing progress/result screen which is displayed on the multiple function device.

FIG. 9 is a view showing one example of a processing progress/result screen 120 which is displayed on the multiple function device 10. The processing progress/result screen 120 displays: "Processing Name" expressing the instruction sheet; "Starting Date" expressing an execution starting date; and "State" expressing an execution state.

Here, a user can browse the progresses and the results of the above-described linking processing through the instruction sheet editor 30 which is a not-shown client terminal. In this case, the client terminal requests the processing state to the linking processing server 50 and the requested results are displayed on the GUI 31.

The linking processing server 50 analyzes an instruction sheet, calls the service processing devices according to the contents of the instruction sheet to continue the linking processing when the instruction sheet transmitted from the multiple function device 10 is received.

(Search Processing)

Here, detailed processing in the service search server 20 will be explained, taking a case, in which the multiple function device 10 is newly installed, as one example.

The multiple function device 10, which is newly connected to the network 5, transmits a part of the I/F information which has been stored in the I/F information memory 12 (for example, <Service Class>, <Service Name>, <Service information location>, <Input>, and <Output>) to the service search server 20 at regular time intervals. Here, the multiple function device 10 may transmit all pieces of the I/F information to the service search server 20.

The registered information memory 21 of the service search server 20 regularly updates and stores I/F information transmitted not only from the newly installed multifunction device 10, but also from other service processing devices. Thereby, the registered information memory 21 is under full time connection to the network 5 even in the case of failures/changes in the service processing devices, and stores at least the outlines and the addresses (URLs) of the services of all available service processing devices.

The registered information search section 22 searches for currently-available services, using the I/F information which has been stored in the registered information memory 21, when search of a desired service is requested from the instruction sheet editor 30. Here, the registered information search section 22 may search services with, for example, the same <Service Class> and <Service Name>, or the same <Input> and <Output> as required ones among information stored in the registered information memory 21 as a search method.

The search result response section 23 makes a service list expressing a list of services meeting the search requirements from the instruction sheet editor 30, based on the search result in the registered information search section 22, and also transmits the service information location on each service processing device with the service list to the instruction sheet editor 30. The instruction sheet making section 32 in the instruction sheet editor 30 displays the service list, which is transmitted from the service search server 20, on the GUI 31.

At this time, a user can find a desired service which the user desires to use in the service list displayed on the GUI 31. Furthermore, an instruction sheet for linking processing among services may be made by the user, using services in the service list.

The instruction sheet making section 32 acquires the I/F information by access to the relevant multiple function device 10, using the service information location of a service (for example, of the multiple function device 10) selected by a user when the instruction sheet is made.

Subsequently, the instruction sheet making section 32 refers to the input and output information of respective I/F information to make the I/F information consist among linked services when a workflow is made. That is, The instruction sheet making section 32 browses and uses the I/F information transmitted from the multiple function device 10, and makes an object workflow by combination of services which are provided by a single or a plurality of the multiple function devices 10. Subsequently, in the instruction sheet making section 32, the made flow is converted into an instruction sheet, which the linking processing server 50 may interpret, for registration in the instruction sheet management server 40.

As described above, as the document processing system 1 according to the first embodiment may search currently available services by the service search server 20 and may generate an instruction sheet expressing a workflow, using the I/F information for the service processing devices which execute the searched service processing, the instruction sheet may be easily and freely made even after reconstructing the system by removing or adding new services or devices.

Also, the document processing system 1 can improve the convenience when a user makes workflow, even if the user doesn't grasp all services, because the document processing system 1 can search for necessary services and make an instruction sheet.

Furthermore, the failures in the whole system, which are caused by failures in a part of the service processing devices, may be prevented in the document processing system 1 by making substitution service processing devices execute predetermined processing, as a new instruction sheet may be easily made by acquiring the I/F information from available service processing devices even in the case of failures/changes and the like in the service processing devices.

Here, the registered information memory 21 of the service search server 20 may store only a part of or all pieces of the I/F information transmitted from the service processing devices. Also, the search result response section 23 may transmit not only a part (service information location) of, but also all pieces of the I/F information of each service processing device to the instruction sheet editor 30, so that the instruction sheet editor 30 does not need to access a corresponding service device in order to get the I/F information.

Second Embodiment

Then, a second embodiment of the invention will be explained. Here, parts similar to those in the first embodiment are denoted by the same reference numerals as those in the first embodiment, and duplicate description will be eliminated.

Figure 10:
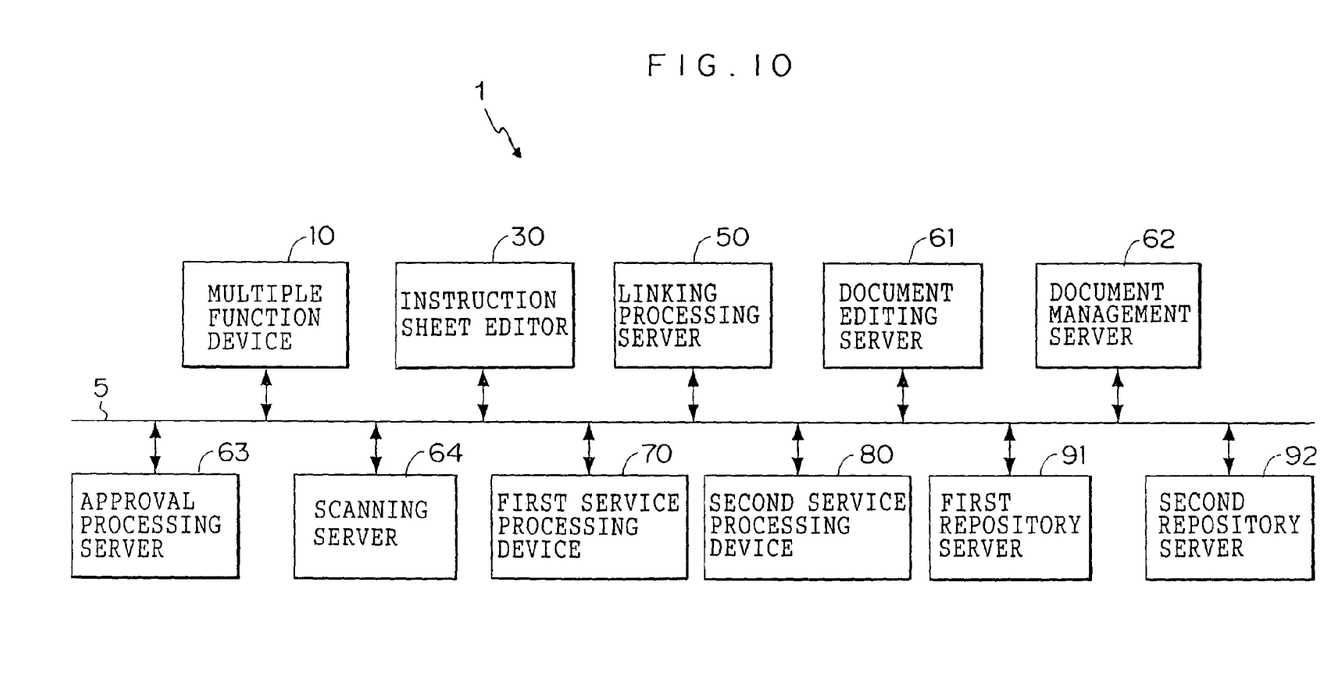
FIG. 10 is a block diagram showing a configuration of a document processing system according to a second embodiment.

FIG. 10 is a block diagram showing a configuration of a document processing system 1 according to the second embodiment. The document processing system 1 according to the present embodiment has a configuration which has a similar one to that of the first embodiment, but excludes the service search server 20.

The document processing system 1 comprises: a multiple function device 10 which executes service processing of copying, printing, scanning, and a facsimile service; an instruction sheet editor 30 which is a client terminal and makes an instruction sheet; a linking processing server 50 which controls the execution of services according to an instruction sheet; a document editing server 61 which has a document editing function; a document management server 62 which manages documents; an approval processing server 63 which has an approval processing function; a scanning server 64 which transmits scanned data to an arbitrary address; a first repository server 91 which has an instruction sheet management function; and a second repository server 92 which saves predetermined data. Here, detailed configurations of the multiple function device 10, the instruction sheet editor 30, and the linking processing server 50 have the same ones as those of FIG. 2.

The first repository server 91 comprises the same instruction sheet management section 41 as that of the first embodiment. The second repository server 92 makes text data by execution of OCR processing of input image data, attaches original image data to the relevant text data, and saves them.

In the document processing system 1 with the above-described configuration, the instruction sheet editor 30 makes an instruction sheet as follows.

In the first place, a user operates the GUI 31 of the instruction sheet editor 30 and inputs service information location (URL of a port) to acquire the I/F information on the scanning server 64.

The instruction sheet making section 32 acquires the I/F information on the scanning server 64, based on the service information location which has been input through the GUI 31, analyzes the relevant I/F information, and displays an instruction sheet making screen on the GUI 31. Here, a "Scan to file" function which is one of the services of the scanning server 64 is selected, and an instruction to reserve scanned images in the second repository server 92 is input through operation of the GUI 31 by the user.

Also, the instruction sheet making section 32 acquires the I/F information on the second repository server 92 in a similar manner to that of the scanning server 64, analyzes the relevant I/F information, and displays the instruction sheet making screen on the GUI 31. Here, Here, an instruction to attach a text, which has undergone OCR processing by the second repository server 92, to original images is input by operation of the GUI 31 by the user.

The instruction sheet making section 32 makes an instruction sheet according to operation of the GUI 31 as described above and saves the made instruction sheet in the first repository server 91.

On the other hand, in the service processing devices (for example, the multiple function device 10), the service controller 13 reads out an instruction sheet kept in the first repository server 91 according to operation of the GUI 14 by a user and makes the service providing section 11 execute services according to the read instruction sheet.

The first repository server 91 transmits an instruction sheet to the linking processing server 50. The linking processing server 50 analyzes the instruction sheet and continues linking processing.

As described above, the document processing system 1 according to the second embodiment may freely design an instruction sheet, which expresses a workflow, by acquiring I/F information from a predetermined service processing device, using the service information location which a user has specified, and making the instruction sheet.

Here, the invention is not limited to the above-described first and second embodiments and various kinds of modifications in the designing may be executed within the range described in the claims.

For example, a predetermined server may have the linking start function or a linking start device may be provided on the network 5, though the multiple function device 10 has had the linking start function. Moreover, a predetermined server may function as a client terminal or a client terminal may be provided on the network 5, though the instruction sheet editor 30 has had a function as a client terminal.

In addition, the multiple function device 10 according to the second embodiment may have another configuration in which a function as the first repository server 91, other than the above-described functions, is further provided.

What is claimed is:

1. A linking information making device comprising:
    a service search server comprising:
        a service list acquisition section which acquires a service list expressing respective services each of which execute predetermined processings on document data, the respective services being provided by a plurality of currently-available service processing devices;
    a client terminal in communication with the service list acquisition section, the client terminal comprising:
        an interface information acquisition section which acquires, for each of the currently-available services being provided, a respective piece of interface information including a method by which the corresponding predetermined processing is started, and
        a linking information making section which makes linking information to be used for linking the predetermined processings based on the interface information which has been acquired by the interface information acquisition section, and transmits the linking information, the linking information including information to be displayed on respective screens of one or more of the currently-available service processing devices and to be selected by a user operating one of the screens when the user instructs to start linking the predetermined processings; and
    an instruction sheet management server comprising:
        a management section which stores the transmitted linking information and further transmits the stored linking information to the one or more of the currently-available service processing devices for displaying on the screen based on a request from the currently-available service processing devices,
    wherein the client terminal further comprises a display which displays a first window including a first icon corresponding to first interface information acquired by the interface information acquisition section, a second window including a second icon corresponding to a linking pattern, and a third window including linked first and second icons dragged and dropped from the first and second windows by the user, and
    the linking information making section makes the linking information in accordance with the linked first and second icons in the third window and makes the linking information without specifying a service processing device,
    the interface information includes a predetermined parameter restriction rule which restricts an input and an output,
    the linking information includes a control structure, a logical operation and an arithmetic operation.

2. A document processing system, comprising: the linking information making device according to claim 1 which acquires the service list transmitted from a search device and the pieces of the interface information from the currently-available service processing devices via the search device; and a plurality of currently-available service processing devices which provide services for executing predetermined processings of document data and transmit the pieces of the interface information to the search device, the search device provided with: a service information storage section for storing the pieces of the interface information which have been transmitted from the currently-available service processing devices; a search section for searching services corresponding to services, for which search has been requested, using the pieces of the interface information which have been stored in the service information storage section; and a transmission section which transmits the service list based on the search results of the search section.

3. A document processing system according to claim 2, wherein the transmission section of the search device transmits the service list expressing services which are services provided by the currently-available service processing devices and which correspond to services for which search has been requested, to the linking information making device.

4. A document processing system according to claim 2, wherein the currently-available service processing devices transmit pieces of input information and pieces of output information on services, service names, and service information location as the interface information.

5. A document processing system according to claim 2, wherein the interface information acquisition section of the linking information making device acquires pieces of service information location for accessing the respective currently-available service processing devices, from the search device, and acquires pieces of interface information from the currently-available service processing devices based on pieces of the acquired service information location.

6. A linking information making device according to claim 1, wherein the linking information is a file in an XML format.

7. The linking information making device according to claim 1, wherein the management section stores a plurality of the linking information as a plurality of workflows.

8. A linking information making method comprising:

acquiring a service list expressing respective services, which execute predetermined processings of document data, the respective services being provided by currently-available service processing devices;

further acquiring pieces of interface information corresponding to the respective currently-available service processing devices from the respective currently-available service processing devices, the interface information including a method by which the predetermined processing is started; displaying the pieces of interface information;

making linking information to be used for linking the predetermined processings based on the acquired pieces of the interface information, the linking information including information to be displayed on a screen of one or more currently-available service processing devices and to be selected by a user operating the screen when the user instructs to start the predetermined processings; and transmitting the linking information to the one or more currently-available service processing devices based on a request from the one or more currently-available service processing devices, wherein the pieces of interface information are displayed as icons, the step of making linking information includes (i) linking selected ones of the displayed icons in accordance with a user operation, the user operation including dragging and dropping the selected ones of the icons corresponding to respective pieces of interface information to generate linked icons, and (ii) making the linking information in accordance with the linked icons and without specifying a service processing device, the interface information further including a predetermined parameter restriction rule which restricts an input and an output, the linking information further including a control structure, a logical operation and an arithmetic operation.

9. A linking information making method according to claim 8, wherein the linking information is a file in an XML format.

10. The linking information making method according to claim 8, further comprising storing a plurality of the linking information as a plurality of workflows.

11. A computer-readable recording medium that stores a program for controlling a computer to execute a processing for making linking information, the program including instructions for controlling the computer to execute:

acquiring a service list expressing respective services, which execute predetermined processings of document data, the respective services being provided by currently-available service processing devices;

further acquiring pieces of interface information corresponding to the respective currently-available service processing devices from the respective currently-available service processing devices, the interface information including a method by which the predetermined processing is started;

displaying the pieces of interface information;

making linking information to be used for linking the predetermined processings based on the acquired pieces of the interface information, the linking information including information to be displayed on a screen of one or more currently-available service processing devices and to be selected by a user operating the screen when the user instructs to start linking the predetermined processings; and transmitting the linking information to the one or more currently-available service processing devices based on a request from the one or more currently-available service processing devices, wherein the pieces of interface information are displayed as icons, the step of making linking information includes (i) linking selected ones of the displayed icons in accordance with a user operation, the user operation including dragging and dropping the selected ones of the icons corresponding to respective pieces of interface information to generate linked icons, and (ii) making the linking information in accordance with the linked icons and without specifying a service processing device, the interface information further including a predetermined parameter restriction rule which restricts an input and an output, the linking information further including a control structure, a logical operation and an arithmetic operation.

12. A computer-readable recording medium according to claim 11, wherein the linking information is a file in an XML format.

13. The computer-readable recording medium according to claim 11, further comprising storing a plurality of the linking information as a plurality of workflows.

14. A computer-readable recording medium that stores a program for controlling a computer to execute a processing for making linking information, the program including instructions for controlling the computer to execute:

acquiring, from currently-available service processing devices through a network, pieces of service information expressing different types of processings executed by the currently-available service processing devices on document data;

displaying the pieces of service information on a display;

making linking information that links the processings to be executed by the currently-available service processing devices as a workflow based on a user operation on the display;

storing a plurality of pieces of the linking information as a plurality of workflows in a storage unit, and transmitting, in response to a requirement from one of the currently-available service processing devices, the plurality of pieces of the stored linking information through the network to the one of the currently-available service processing devices so that a list of the plurality of workflows are displayed on a screen of the one of the currently-available service processing devices for a user selection, wherein the pieces of service information are displayed as icons, the user operation on the display includes dragging and dropping icons corresponding to the pieces of service information corresponding to the processings to be executed to generate linked icons, and the step of making linking information includes making the linking information in accordance with the linked icons and without specifying a service processing device, and one of the workflows is started based on the user selection, the user operation includes a predetermined parameter restriction rule which restricts an input and an output to, the linking information further including a control structure, a logical operation and an arithmetic operation.

15. The computer-readable recording medium according to claim 14, wherein the linking information is a file in an XML format.

16. The computer-readable recording medium according to claim 14, wherein the transmitting comprises transmitting the plurality of pieces of the linking information in response to a request from one or more of the currently-available service processing devices.

17. The computer-readable recording medium according to claim 14, wherein the service information includes a service list and pieces of interface information corresponding to the respective currently-available service processing devices.

18. A document processing system, comprising:
(1) a linking information making device which acquires a service list transmitted from a search device and pieces of interface information, the interface information further including a predetermined parameter restriction rule which restricts an input and an output, from a plurality of currently-available service processing devices via the search device, the linking information making device comprising:
a service search server comprising:
a service list acquisition section which acquires the service list expressing respective services each of which execute predetermined processings on document data, the respective services being provided by the plurality of currently-available service processing devices;
a client terminal in communication with the service list acquisition section, the client terminal comprising:
an interface information acquisition section which acquires, for each of the services being provided, a respective piece of the interface information including information about a method by which the corresponding predetermined processing is started, and
a linking information making section which makes linking information to be used for linking the predetermined processings based on the interface information which has been acquired by the interface information acquisition section, and transmits the linking information, the linking information including information to be displayed on respective screens of one or more of the currently-available service processing devices and to be selected by a user operating one of the screens when the user instructs to start linking the predetermined processings, the linking information including a control structure, a logical operation and an arithmetic operation; and
an instruction sheet management server comprising:
a management section which stores the transmitted linking information and further transmits the stored linking information to the one or more of the currently-available service processing devices for displaying on the screen based on a request from the currently-available service processing devices,
wherein the client terminal further comprises a display which displays a first window including a first icon corresponding to first interface information acquired by the interface information acquisition section, a second window including a second icon corresponding to a linking pattern, and a third window including linked first and second icons dragged and dropped from the first and second windows by the user, and
the linking information making section makes the linking information in accordance with the linked first and second icons in the third window and makes the linking information without specifying a service processing device;
(2) a linking information management server which saves a plurality of linking information made by the linking information making device;
(3) a client server which includes a GUI displaying a plurality of linking information saved in the linking information management server, selecting one of a plurality of linking information and inputting at least one parameter into selected linking information;
(4) a linking processing server which executes the linking information inputted the parameter; and
(5) a plurality of currently-available service processing devices which provide services for executing processings of document data in accordance with the linking information executed by the linking processing server and transmit the pieces of the interface information to the search device,
the search device provided with:
a service information storage section for storing the pieces of the interface information which have been transmitted from currently-available service processing devices;
a search section for searching services corresponding to services, for which search has been requested, using the pieces of the interface information which have been stored in the service information storage section; and
a transmission section which transmits the service list based on the search results of the search section.

* * * * *